United States Patent [19]

Kido

[11] Patent Number: 6,044,999
[45] Date of Patent: Apr. 4, 2000

[54] HOLLOW RESIN CONTAINER

[75] Inventor: Katsuyuki Kido, Seto, Japan

[73] Assignee: Toyota Jidosha Kabushiki Kaisha, Toyota, Japan

[21] Appl. No.: 09/204,360

[22] Filed: Dec. 4, 1998

[30] Foreign Application Priority Data

Jan. 13, 1998 [JP] Japan ................... 10-004598

[51] Int. Cl.[7] ................ B65D 6/14; B65D 90/02
[52] U.S. Cl. ............ 220/62.11; 137/524; 220/62.22; 220/563; 220/665
[58] Field of Search ................ 220/562, 563, 220/564, 665, 626, 62.22, 4.12, 4.14, 4.13, 88.1, FOR 165, FOR 177, 501, 62.11; 137/524

[56] References Cited

U.S. PATENT DOCUMENTS

| 973,474 | 10/1910 | Cameron | 220/563 |
| 3,912,107 | 10/1975 | Baumann | 220/563 |
| 5,129,544 | 7/1992 | Jacobson et al. | 220/62.11 X |
| 5,589,241 | 12/1996 | Stiles et al. | 428/36.9 |

FOREIGN PATENT DOCUMENTS

| 55-110433 | 1/1979 | Japan . |
| 58-202112 | 11/1983 | Japan . |
| 62-20922 | 2/1987 | Japan . |

*Primary Examiner*—Allan N. Shoap
*Assistant Examiner*—Joe Merek
*Attorney, Agent, or Firm*—Pillsbury Madison & Sutro, LLP

[57] ABSTRACT

In a hollow resin container, at a connecting portion between a separator and a resin layer, through-holes, each of which has a surface which is coplanar with and continuous with an inner side surface of the hollow resin container and whose axial direction cross-sectional configuration is triangular, are formed at a base portion of the separator. The surfaces of bottom portions of the through-holes, which surfaces are coplanar with and continuous with the inner side surface of the hollow resin container, are covered with the gas barrier sheet. Namely, a cross-sectional area S of the separator at the connecting portion in a plane which is coplanar with the inner side surface of the hollow resin container is smaller than a cross-sectional area S4 of the separator in a plane parallel to the aforementioned plane and at a region at which the through-holes are not formed (S4>S). As a result, at the connecting portion between the separator and the resin layer, a region at which the gas barrier sheet does not exist is made small. Therefore, sealability at the connecting portion can improve.

5 Claims, 7 Drawing Sheets

HOLLOW RESIN CONTAINER

BACKGROUND OF THE INVENTION

1. Field of the Invention

The present invention relates to a hollow resin container, such as a fuel tank or the like, which is provided in an automobile.

2. Description of the Related Art

Figure 6:
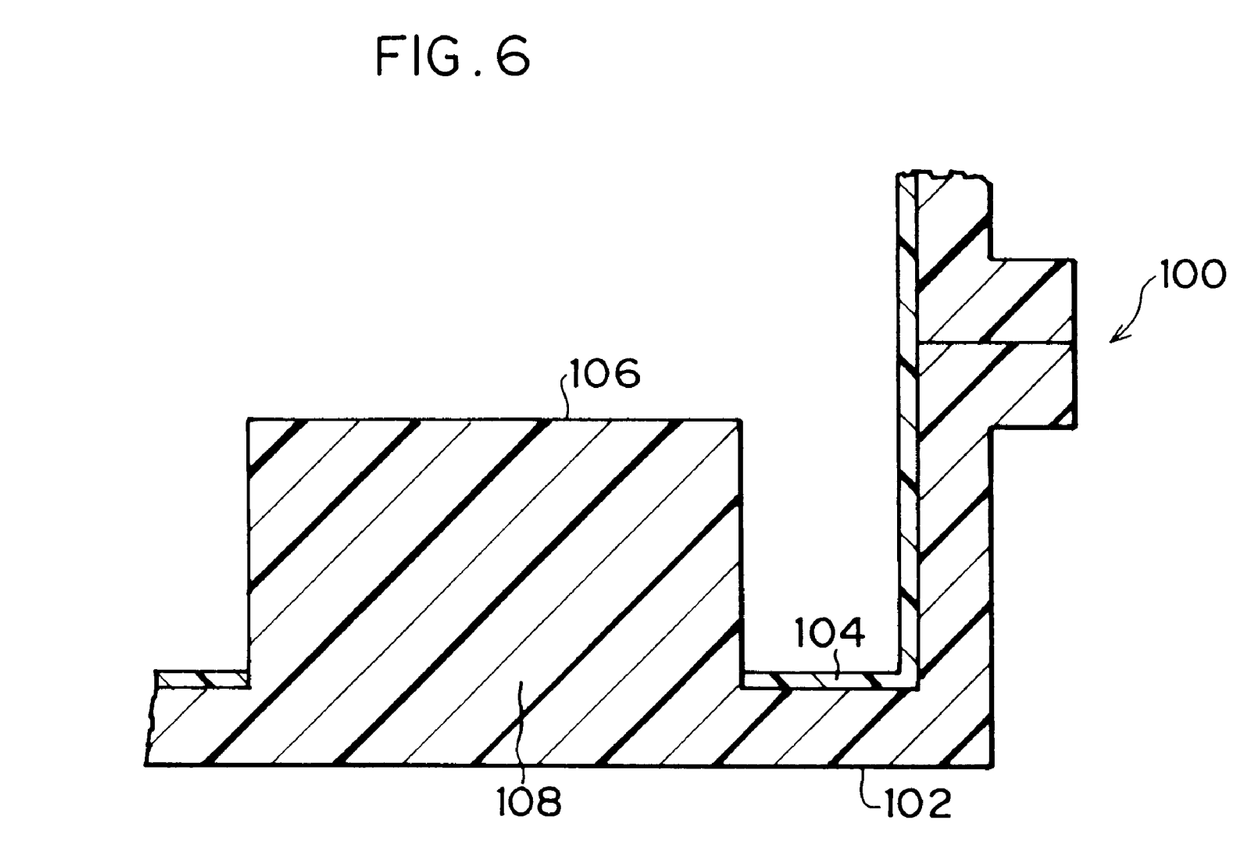
FIG. 6 is a side cross-sectional view which shows a separator connecting portion in a conventional hollow resin container.

FIG. 6 shows an example of a hollow resin container, such as a fuel tank, which is provided in an automobile. In this fuel tank 100, a gas barrier sheet 104 serving as a sheet material for preventing the permeation of gasoline is provided on a matrix resin layer 102 at the inner side of the tank 100.

In this fuel tank 100, a separator 106 which is an internal part is molded integrally with the resin layer 102 at the interior of the container. Accordingly, the gas barrier sheet 104 is cut at a connecting portion 108 between the separator 106 and the resin layer 102. As a result, a region, in which the gas barrier sheet 104 does not exist, is formed at the connecting portion 108 between the separator 106 and the resin layer 102. Therefore, sealability at this region is low.

Figure 7:
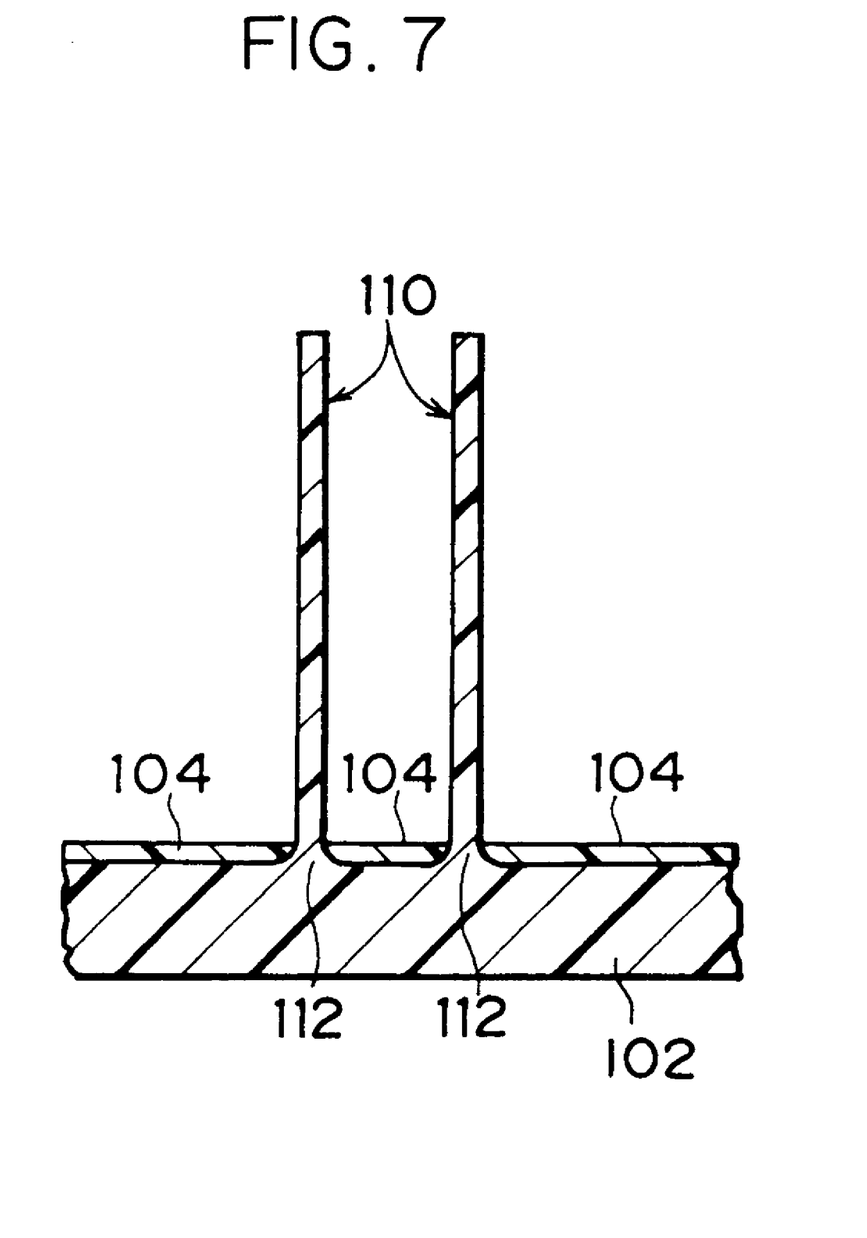
FIG. 7 is a side cross-sectional view which shows a sub-tank connecting portion in the conventional hollow resin container.

Further, as shown in FIG. 7, in this fuel tank 100, a sub-tank 110 which is an internal part is molded integrally with the resin layer 102 inside the container. Accordingly, the gas barrier sheet 104 is cut at a connecting portion 112 between the sub-tank 110 and the resin layer 102. As a result, a region, in which the gas barrier sheet 104 does not exist, is formed at the connecting portion 112 (at two places) between the sub-tank 110 and the resin layer 102. Therefore, sealability in this region is low.

SUMMARY OF THE INVENTION

With the aforementioned in view, an object of the present invention is to obtain a hollow resin container which can improve sealability at a connecting portion between a resin layer and an internal part.

A first aspect of the present invention is a hollow resin container which is formed by a resin layer, wherein: the hollow resin container includes an internal part which is molded integrally with the resin layer at an interior of the hollow resin container, the inner surface of the hollow resin container other than a region at which the internal part is formed is covered by a sheet material, a through-hole which has a surface which is coplanar with and continuous with the inner surface of the hollow resin container is formed at the internal part, and the surface of the through-hole which is coplanar with and continuous with the inner surface of the hollow resin container is covered by the sheet material.

Accordingly, at the connecting portion between the internal part and the resin layer, the region at which no sheet material exists is made smaller. As a result, sealability at the connecting portion between the internal part and the resin layer is excellent.

A second aspect of the present invention is a hollow resin container according to the first aspect, wherein a plurality of the through-holes are formed at the internal part, and the surface of each of the through-holes which is coplanar with and continuous with the inner surface of the hollow resin container is covered by the sheet material.

A third aspect of the present invention is a hollow resin container according to the first aspect, wherein the axial direction configuration of the through-hole is a prism-shaped configuration whose bottom surface is the surface which is coplanar with and continuous with the inner surface of the hollow resin container.

A fourth aspect of the present invention is a hollow resin container according to the third aspect, wherein the prism-shaped configuration is a triangular prism-shaped configuration.

Consequently, in the hollow resin container of these aspects of the present invention, the structure is simple, and at the connecting portion between the internal part and the resin layer, the region at which no sheet material exists is made smaller, and sealability at the connecting portion between the internal part and the resin layer is excellent.

A fifth aspect of the present invention is a hollow resin container according to the first aspect, wherein the internal part is branched off from the vicinity of a connecting portion between the internal part and the resin layer.

Therefore, the structure is simple, and at the connecting portion between the internal part and the resin layer, the region at which no sheet material exists is smaller, and sealability at the connecting portion between the internal part and the resin layer is excellent.

DESCRIPTION OF THE PREFERRED EMBODIMENTS

A hollow resin container (e.g., an automobile fuel tank) relating to a first embodiment of the present invention will be explained in detail in accordance with FIGS. 1 through 3.

Figure 3:
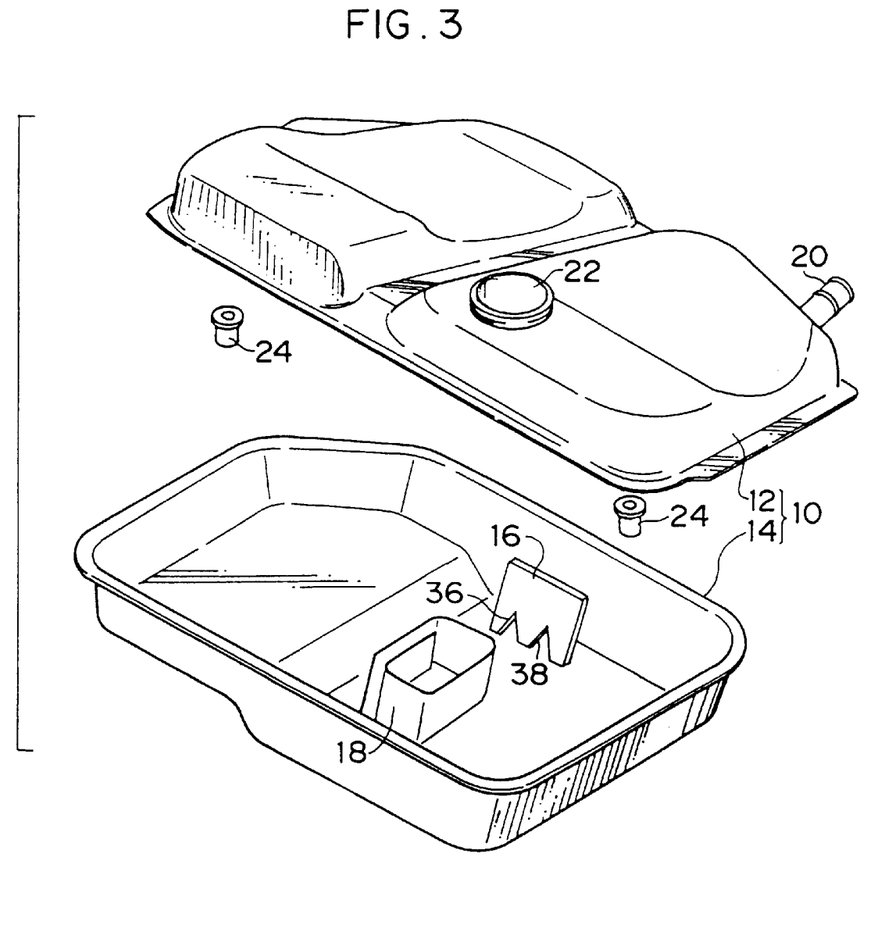
FIG. 3 is an exploded perspective view which shows a hollow resin container relating to the first embodiment of the present invention.

As shown in FIG. 3, a fuel tank 10 of the first embodiment comprises a fuel tank upper 12 and a fuel tank lower 14. A separator 16 and a sub-tank 18 which are internal parts are molded integrally with the bottom portion of the fuel tank lower 14 at the inner side thereof. An inlet hose 20, a pump assembly 22, and a cut-off valve 24 are also shown in FIG. 3.

Figure 1:
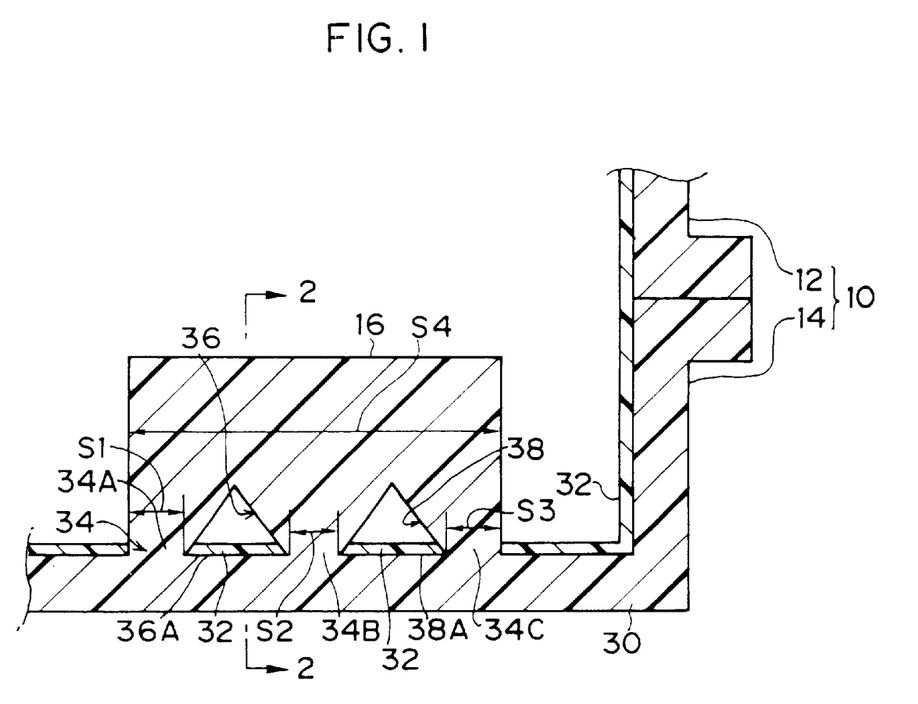
FIG. 1 is a side cross-sectional view which shows a separator connecting portion in a hollow resin container relating to a first embodiment of the present invention.

As shown in FIG. 1, the fuel tank 10 is formed by a matrix resin layer 30 and a gas barrier sheet 32 serving as a sheet material. The tank inner side of the matrix resin layer 30 is covered by the gas barrier sheet 32.

The gas barrier sheet 32 has a laminated structure in which a gas barrier layer having the ability to prevent the permeation of gas is disposed between resin layers which are formed of the same resin as the matrix resin layer 30 of the hollow resin container. The gas barrier layer is also referred to as a gas permeation resistant layer and is formed from ethylene-vinyl alcohol (EVOH) or the like. The resin layers are formed from a resin which is the same resin as the matrix resin (e.g., polyethylene resin) of the hollow resin container. The gas permeation resistance of the gas barrier sheet 32 is improved by the gas barrier layer, and the gas barrier sheet 32 fits more closely to the matrix of the hollow resin container due to the resin layer.

Figure 2:
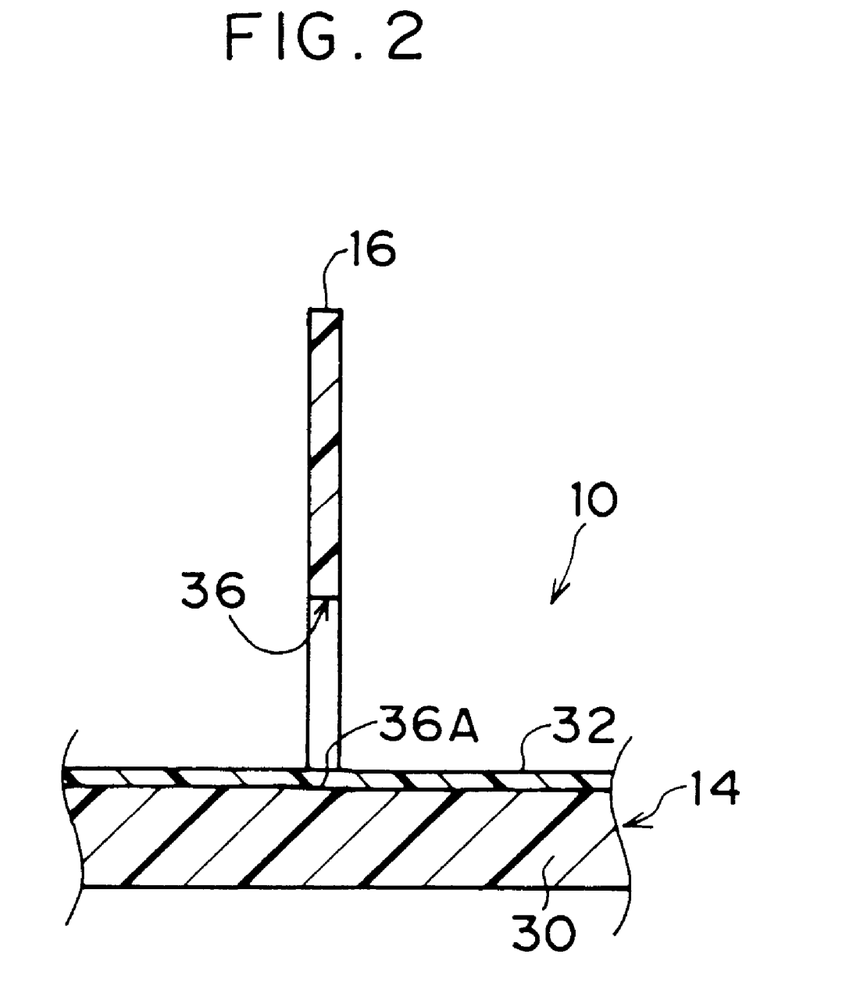
FIG. 2 is a cross-sectional view taken along line 2—2 in FIG. 1.

As shown in FIG. 2, the separator 16 is formed in the shape of a thin plate and is molded integrally with the resin layer 30 of the fuel tank lower 14 at the time of molding.

As shown in FIG. 1, at a connecting portion 34 between the resin layer 30 and the separator 16, the connecting portion 34 is divided into a plurality of connecting portions 34A, 34B, and 34C. Namely, through-holes 36 and 38, each of which has a bottom surface which is coplanar with and continuous with the fuel tank 10 inner side surface of the resin layer 30 and whose axial direction cross-sectional configuration is triangular, are formed at the base portion of the separator 16. The surfaces of bottom portions 36A and 38A of these through-holes 36 and 38, which surfaces are coplanar with and continuous with the fuel tank 10 inner side surface of the resin layer 30, are covered with the gas barrier sheet 32.

Next, operation of the first embodiment will be explained.

As shown in FIG. 1, in the first embodiment, at the connecting portion 34 between the separator 16 and the resin layer 30, the through-holes 36 and 38, each of which has a bottom surface which is coplanar with and continuous with the inner side surface of the resin layer 30 and whose axial direction cross-sectional configuration is triangular, are formed at the base portion of the separator 16. The surfaces of the bottom portions 36A and 38A of these through-holes 36 and 38, which surfaces are coplanar with and continuous with the inner side surface of the resin layer 30, are covered by the gas barrier sheet 32.

Accordingly, in the fuel tank 10 of the first embodiment, the cross-sectional area S of the separator 16 at the connecting portion 34, i.e., the cross-sectional area of the separator in the plane which is coplanar with the bottom portions 36A, 36B of the through-holes 36, 38 (i.e., which is coplanar with the fuel tank 10 inner side surface of the resin layer 30 at the fuel tank lower 14), is the sum S of cross-sectional areas S1, S2, and S3 (S=S1+S2+S3). This cross-sectional area S is smaller than the cross-sectional area S4 of the separator 16 in a plane which is parallel to the aforementioned plane (i.e., which is parallel to the bottom portions 36A, 38A of the through-holes 36, 38) and which is at a region of the separator 16 at which the through-holes 36 and 38 are not formed. Namely, S4>S. As a result, at the connecting portion 34 between the separator 16 and the resin layer 30, the region at which no gas barrier sheet 32 exists is reduced as compared to that of the conventional hollow resin container shown in FIG. 6, and sealability at the connecting portion 34 can be improved.

Further, the fuel tank 10 of the first embodiment has a structure in which the through-holes 36 and 38, each of which has a surface which is coplanar with and continuous with the inner side surface of the resin layer 30 and whose axial direction cross-sectional configuration is triangular, are formed at the base portion of the separator 16 in the conventional hollow resin container as shown in FIG. 6. The structure of the fuel tank 10 is simple, and sealability at the connecting portion 34 between the separator 16 and the resin layer 30 can be improved.

Next, a hollow resin container relating to a second embodiment of the present invention will be explained in detail in accordance with FIGS. 4 and 5.

Members which are the same as those in the first embodiment are denoted by the same reference numerals, and descriptions thereof are omitted.

Figure 5:
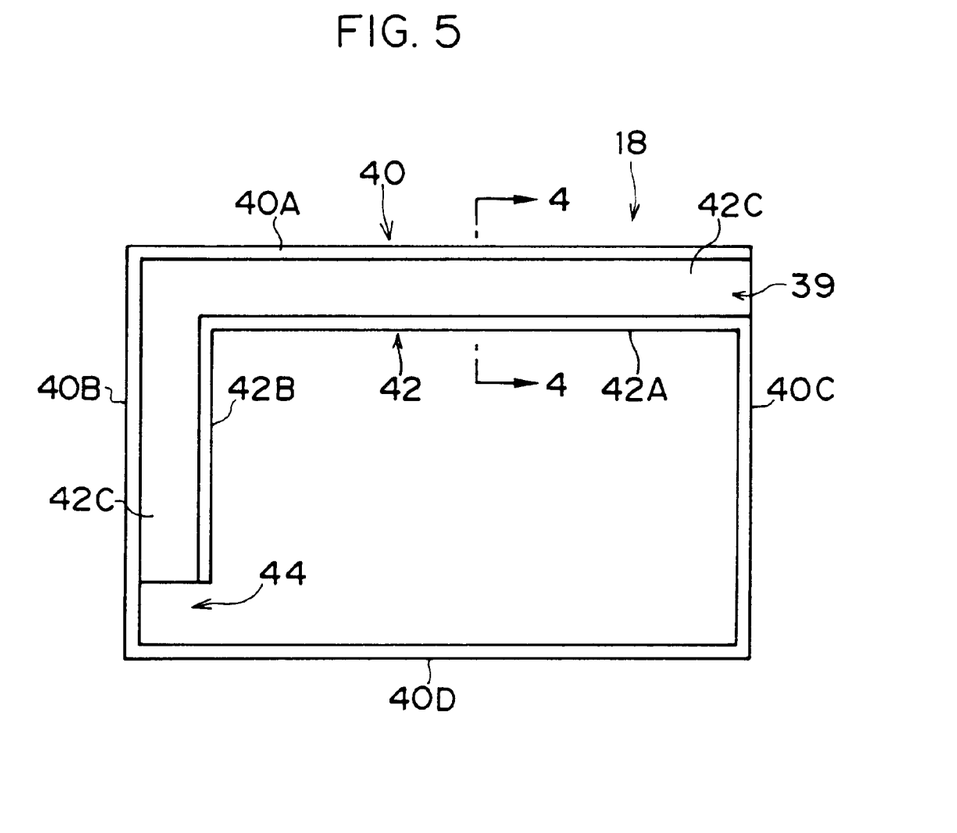
FIG. 5 is a plan view which shows a sub-tank in a hollow resin container relating to a second embodiment of the present invention.

As shown in FIG. 5, a sub-tank 18, which is molded integrally with the fuel tank in the second embodiment, includes an outer wall portion 40, which is rectangular when viewed from above and in which a space 39 is formed at a corner portion, and an inner wall portion 42 which is L-shaped when viewed from above.

A long edge portion 42A of the inner wall portion 42 is provided substantially parallel to a long edge portion 40A of the outer wall portion 40, and a short edge portion 42B of the inner wall portion 42 is provided substantially parallel to a short edge portion 40B of the outer wall portion 40. The long edge portion 42A of the inner wall portion 42 is connected to another short edge portion 40C of the outer wall portion 40 in a region which is adjacent to the space 39. A space 44 is formed between the short edge portion 42B of the inner wall portion 42 and another long edge portion 40D of the outer wall portion 40.

Figure 4:
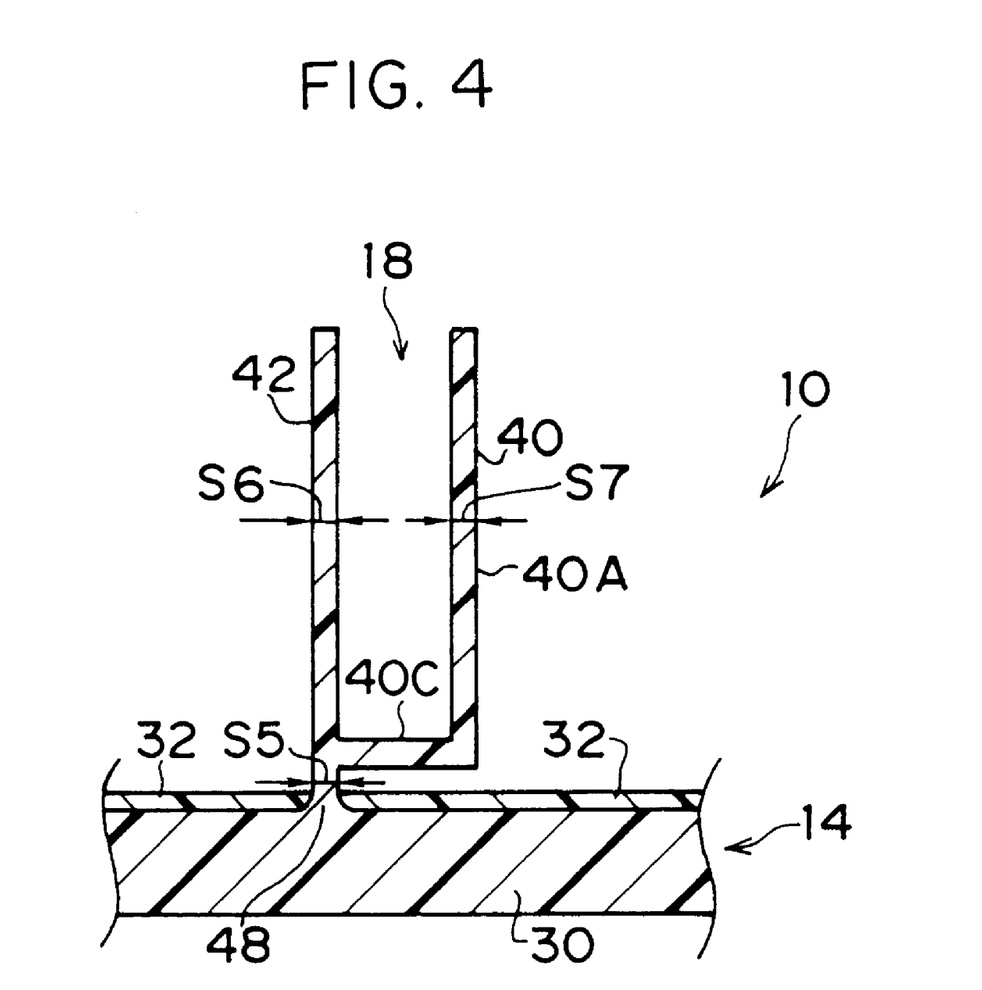
FIG. 4 is a cross-sectional view taken along line 4—4 in FIG. 5.

As shown in FIG. 4, the outer wall portion 40 of the sub-tank 18 is branched off from the base portion of the inner wall portion 42 in the vicinity of a connecting portion 48 between the resin layer 30 and the sub-tank 18, and is connected to the base portion of the inner wall portion 42 by a branch-off portion 40C. The branch-off portion 40C extends substantially parallel to the fuel tank 10 inner side surface of the resin layer 30 at the fuel tank lower 14.

Next, operation of the second embodiment will be explained.

As shown in FIG. 4, in the second embodiment, the outer wall portion 40 of the sub-tank 18 is branched off from the base portion of the inner wall portion 42 in the vicinity of the connecting portion 48 between the sub-tank 18 and the resin layer 30. The gas barrier sheet 32 is also provided below the branch-off portion 40C of the outer wall portion 40 which is connected to the inner wall portion 42.

Therefore, in the fuel tank 10 of the second embodiment, the cross-sectional area of the connecting portion 48 of the separator 18 in the plane which is coplanar with the fuel tank 10 inner side surface of the gas barrier sheet 32 which covers the resin layer 30 is S5. This cross-sectional area S5 is made smaller than a sum (S6+S7) of cross-sectional area S6 and cross-sectional area S7 of the separator 18 in a plane which is parallel to the aforementioned plane and at a region other than the connecting portion 48. Namely, S5<(S6+S7). As a result, at the connecting portion 48 between the sub-tank 18 and the resin layer 30, the region at which there is no gas barrier sheet 32 is made smaller than that of the conventional hollow resin container as shown in FIG. 7, and sealability at the connecting portion 48 can be improved.

Moreover, the fuel tank 10 of the second embodiment has a structure in which the outer wall portion 40 is branched off from the base portion of the inner wall portion 42 of the sub-tank 18 in the conventional hollow resin container as shown in FIG. 7. The structure of the fuel tank 10 is simple, and sealability at the connecting portion 48 between the sub-tank 18 and the resin layer 30 can be improved.

The present invention has been described in detail hereinbefore with reference to specific embodiments. However, it should be obvious to those skilled in the art that the present invention is not limited to these embodiments and that various other embodiments are possible within the scope of the present invention. For example, in the above-described embodiment, the axial direction configuration of each of the through-holes 36 and 38 is a triangular prism-shape whose bottom surface is coplanar with and continuous with the inner side surface of the resin layer 30. However, the configuration of each of the through-holes 36 and 38 is not limited to a triangular prism-shape, and may be a prism-shape such as a square prism-shape or the like or a column in which the cross-sectional configuration which is normal to the axial direction is a semicircle. Moreover, in the aforementioned embodiments, an example is described of a case in which the automobile fuel tank 10 is used as the hollow resin container. However, the hollow resin container is not limited to the automobile fuel tank 10, and another hollow resin container may be used. Further, the sheet material is not limited to the gas barrier sheet, and another sheet material may be used. The internal part is not limited to the separator 16 and the sub-tank 18, and another part may be used. The internal part may be formed at the fuel tank upper 12. Still further, although injection molding is effected in the above-described embodiments, the present invention may be applied also to injection press molding, hot flow stamping molding, and sheet flow stamping molding.

What is claimed is:

1. A hollow resin container which is formed by a resin layer, wherein:

said hollow resin container includes an internal part which is molded integrally with said resin layer at an interior of said hollow resin container, the inner surface of said hollow resin container other than a region at which said internal part is formed is covered by a sheet material, a through-hole which has a surface which is coplanar with and continuous with the inner surface of said hollow resin container is formed at said internal part, and the surface of the through-hole which is coplanar with and continuous with the inner surface of said hollow resin container is covered by said sheet material.

2. A hollow resin container according to claim 1, wherein a plurality of said through-holes are formed at said internal part, and the surface of each of said through-holes which is coplanar with and continuous with the inner surface of said hollow resin container is covered by said sheet material.

3. A hollow resin container according to claim 1, wherein the axial direction configuration of said through-hole is a prism-shaped configuration whose bottom surface is the surface which is coplanar with and continuous with the inner surface of said hollow resin container.

4. A hollow resin container according to claim 3, wherein the prism-shaped configuration is a triangular prism-shaped configuration.

5. A hollow resin container according to claim 1, wherein said internal part is branched off from a vicinity of a connecting portion between said internal part and said resin layer.

* * * * *